(12) United States Patent
Wilson et al.

(10) Patent No.: US 7,634,599 B2
(45) Date of Patent: Dec. 15, 2009

(54) METHOD FOR IMPROVING INLINE COMPRESSION BANDWIDTH FOR HIGH SPEED BUSES

(75) Inventors: Kenneth Mark Wilson, San Jose, CA (US); Robert Bruce Aglietti, San Jose, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 1502 days.

(21) Appl. No.: 09/895,345

(22) Filed: Jun. 29, 2001

(65) Prior Publication Data

US 2003/0005189 A1  Jan. 2, 2003

(51) Int. Cl.
G06F 13/12 (2006.01)
G06F 13/00 (2006.01)
(52) U.S. Cl. ..................................................... 710/68
(58) Field of Classification Search .................. 710/33, 710/58, 65–71; 715/500, 500.1; 704/500; 709/246; 711/170, 157; 345/667
See application file for complete search history.

(56) References Cited

U.S. PATENT DOCUMENTS

| 5,237,675 A | * | 8/1993 | Hannon, Jr. ................... 710/68 |
| 5,333,277 A | * | 7/1994 | Searls ......................... 710/300 |
| 5,500,933 A | * | 3/1996 | Schnorf ..................... 715/500.1 |
| 5,619,732 A | * | 4/1997 | Yoneyama .................... 710/58 |
| 5,649,151 A | * | 7/1997 | Chu et al. .................... 711/111 |
| 5,903,261 A | * | 5/1999 | Walsh et al. .............. 715/500.1 |
| 5,968,149 A | * | 10/1999 | Jaquette et al. ............... 710/68 |
| 5,974,471 A | * | 10/1999 | Belt ............................... 710/1 |
| 6,055,586 A | * | 4/2000 | Yoneyama .................... 710/33 |
| 6,219,716 B1 | * | 4/2001 | Kumaki ...................... 706/246 |
| 6,654,867 B2 | * | 11/2003 | Wilson et al. ............... 711/213 |
| 6,742,063 B1 | * | 5/2004 | Hellum et al. ................ 710/66 |
| 6,819,271 B2 | * | 11/2004 | Geiger et al. ................. 341/51 |

FOREIGN PATENT DOCUMENTS

WO   WO 9618191 A1 *  6/1996

* cited by examiner

*Primary Examiner*—Christoher B Shin

(57) ABSTRACT

A method for inline bus data compression and decompression is disclosed. In one embodiment, data is selected for transfer via a data bus, the data is divided into byte sized divisions of the bus width, and each byte is compressed by an individual compression engine. The data is then properly sequenced, aligned and recombined and further transmitted in its compressed state. When required to be decompressed, the compressed data is again divided into bytes of compressed data, each byte being decompressed individually, and then restored to the bus in its uncompressed form, in essence, in the reverse order of the compression process.

33 Claims, 4 Drawing Sheets

METHOD FOR IMPROVING INLINE COMPRESSION BANDWIDTH FOR HIGH SPEED BUSES

FIELD OF THE INVENTION

The present invention relates to the field of computer memory management. Specifically, the present invention relates to a method and system for improving inline compression and decompression in computer bus operations.

BACKGROUND OF THE INVENTION

As the gap between hard drive access time and memory access time increases, it is increasingly desirable to locate more data in memory. This is increasingly important because the size of applications and data sets are increasing at a faster rate than the density of main memory. Furthermore, systems with multiprocessors may have many programs running simultaneously with each program having a relatively small number of pages of instructions and data in main memory. Hence, page faults may occur frequently. One way to increase the effective storage capacity of main memory is to compress its contents. However, conventional computer systems may be unable to efficiently manage the compressed data in main memory.

In typical computer operations, data is in near-constant motion in and out of memory; between memory and processors or between other sources and destinations. As processing speeds of computers have increased, the speed demands of compression/decompression engines have increased enormously.

Most conventional compression engines are capable of operating at data bus speeds but not at the bandwidth of, for example, a modern memory bus. This limitation slows down memory bus operations by adding latency to each transaction. A number of techniques have been employed to work around the speed loss associated with both compression and decompression.

One common technique uses multiple compression/decompression engines each of which is fed pieces of any given memory packet. Typically, the packet pieces are equally sized and very large, commonly on the order of one kilobyte or even larger. These large data "chunks" emerge from the compression engine at roughly the same compression ratio but with significant lag in comparison to bus speed. The piece sizes can vary from transaction to transaction, causing the compression engines to almost never be used at full efficiency and, more importantly, the size of compressed, data blocks varies with every transaction, putting huge demands on buffers and significantly reducing overall speed.

What is needed then, is a means of inline compression/decompression of data transmitted in computer buses that fully exploits the speed of available compression engines and exerts minimal impact on the speed and bandwidth of bus transactions as well as minimizing increased complexity of bus structures. A further need exists for such a means to efficiently use resources, such as the memory required for a table specifying the locations of the compressed data and on the compression/decompression engines themselves.

SUMMARY OF THE INVENTION

The present invention provides a method for the inline compression and decompression of data transmitted in computer buses that fully exploits the speed of available compression engines and has minimal impact on the speed and bandwidth of bus transactions. In addition, embodiments of the invention reduce the need for increased complexity of bus structures. Furthermore, embodiments of the invention enable the efficient use of resources, such as the memory required for a table specifying the locations of the compressed data and efficient use of the compression/decompression engines themselves.

A method for inline bus data compression and decompression is disclosed. In one embodiment, data is selected for transfer via a data bus, the data is divided into byte sized divisions of the bus width, and each byte is compressed by an individual compression engine. The data is then properly sequenced, aligned and recombined and further transmitted in its compressed state. When required to be decompressed, the compressed data is again divided into bytes of compressed data, each byte being decompressed individually, and then restored to the bus in its uncompressed form, in essence, in the reverse order of the compression process.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The operation of this invention can be best visualized by reference to the drawings.

SPECIFICATION

Figure 1:
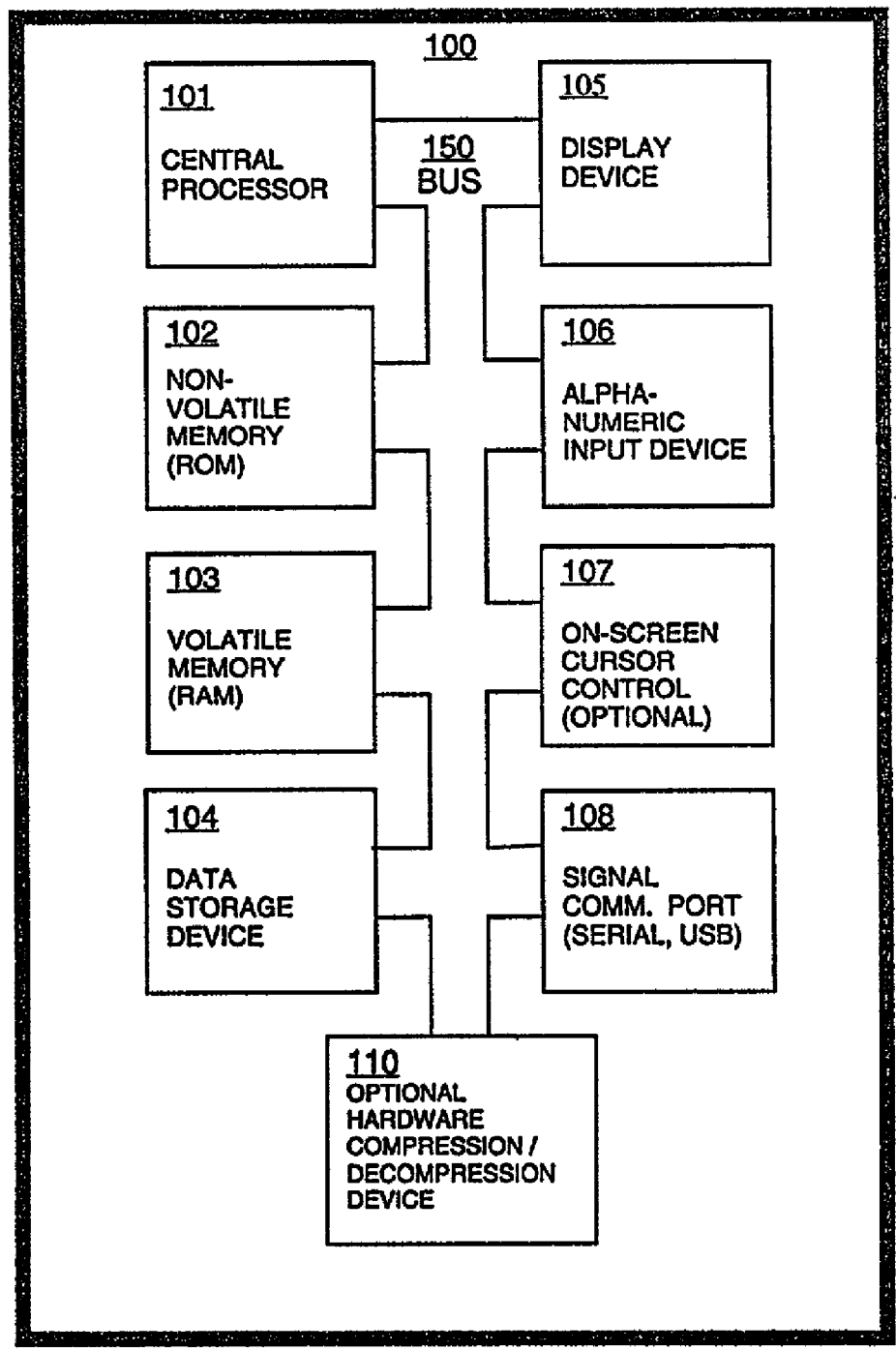
FIG. 1 illustrates a typical computer and bus architecture in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention. Some portions of the detailed descriptions that follow are presented in terms of procedures, logic blocks, processing, and other symbolic representations of operations on data bits within a computer. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the actions and processes of a computer system or similar electronic computing device, that manipulates and transforms data represented as physical (electronic) quantities into other data similarly represented as physical quantities within memory devices, registers, or other information storage or transmission media.

DETAILED DESCRIPTION

This discussion of this embodiment of the present invention addresses inline compression/decompression of computer data. Inline compression/decompression is accomplished while data is en route in a computer bus. In typical computer operations, data is in near-constant motion in and out of memory, between memory and processors or between other sources and destinations. As processing speeds have increased, the demand for speed of memory input and output (I/O) compression/decompression engines has also increased, enormously.

Compression is now being used for wide high speed buses such as memory buses. The only way to avoid delays when performing compression on a memory bus, of course, is to do so at bus speeds. Most conventional compression/decompression engines are capable of operating at data bus speeds but not at the bandwidth of a modern data bus. This limitation slows down data bus operations and a number of techniques have been employed to work around the speed loss associated with both compression and decompression.

Typical implementations of compression/decompression engines are as hardware devices that operate between source and destination devices. They can be completely autonomous or they can be controlled by the operating system (OS). An understanding of these concepts and others presented in this embodiment of the present invention can best be understood by reference to the figures.

FIG. 1 illustrates a typical computer system. As shown, a general purpose computer, 100, comprises bus 150, connecting processor 101, non-volatile ROM 102, RAM 103 and some form of data storage 104, all contained within optional enclosure 100. The computer also likely comprises an optional display device 105, some form of user input such as keyboard 106 and cursor control 107 and possibly other signal input/output circuits 108. Compression/decompression may be handled by dedicated hardware engine 110. If compression and decompression are controlled by software, that software is likely to be resident in ROM 102 or in the OS loaded into memory from data storage device 104.

Another possible arrangement, in this embodiment of the present invention, is the possible placement of compression/ decompression engine 110 in series with RAM 103' bus connection. However placed, the inline compression/decompression concepts presented here are the same.

Figure 2:
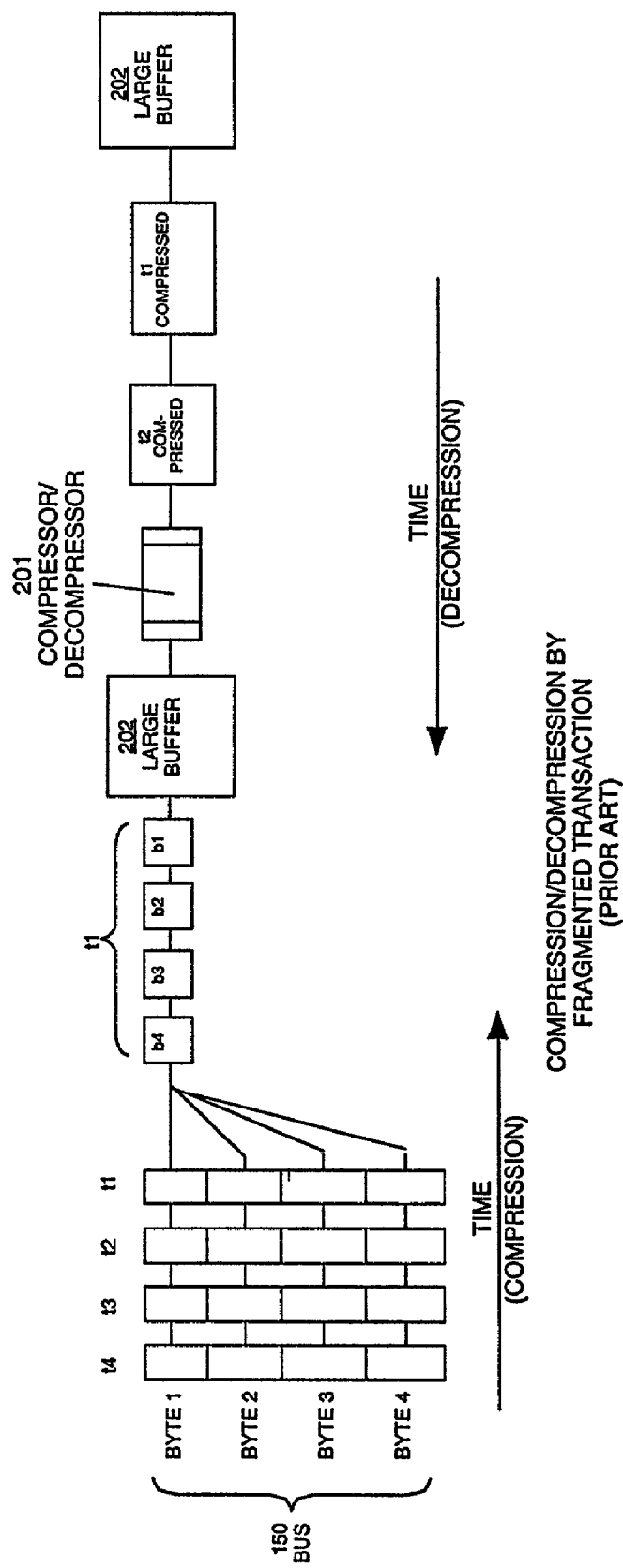
FIG. 2 illustrates a typical inline data compression/decompression operation in accordance with one embodiment of the present invention.

FIG. 2 illustrates a typical inline compression/decompression technique that uses a single compression/decompression engine, 201, to process data blocks being transmitted in a bus. In accordance with this technique, data associated with any particular transaction is fragmented into "digestible" pieces. Most compression/decompression engines perform best processing a single byte of data at a time. Since bus transactions are rarely one byte in width, typical schemes buffer the data to be compressed/decompressed in a large buffer 202 and then perform the compression/decompression as a separate operation independent of the bus. The resulting data is them stored in yet another large buffer 202 before being sent to its destination. This is not the best solution since it adds a long latency before compression/decompression is not performed at bus speeds.

When a data block to be compressed/decompressed is too large in size, previous architectures have reduced the size of the block by dividing the data by successive factors of two. Reducing the size of the data block reduces the latency of compression/decompression when trying to find a small amount of data, since only the section of the original data block with the requested data must be compressed or decompressed.

A common compression/decompression technique that uses multiple compression engines feeds each engine a piece of any given data packet. Typically, the packet pieces are of equal size and emerge from the compression engine at roughly the same compression ratio. Unfortunately, as in common techniques using a single engine, the compressed data piece sizes vary and the compression engines are almost never used at full efficiency. Furthermore, compression and decompression both add varying latency with larger processed data blocks, increasing the demand on buffering to maintain proper sequencing and alignment in the engines' output. The embodiment of the present invention discussed here presents two methods describing inline compression/ decompression that use multiple parallel compression engines and allow the operations to occur at high bus speeds with minimal buffering and latency in each transaction.

Figure 3:
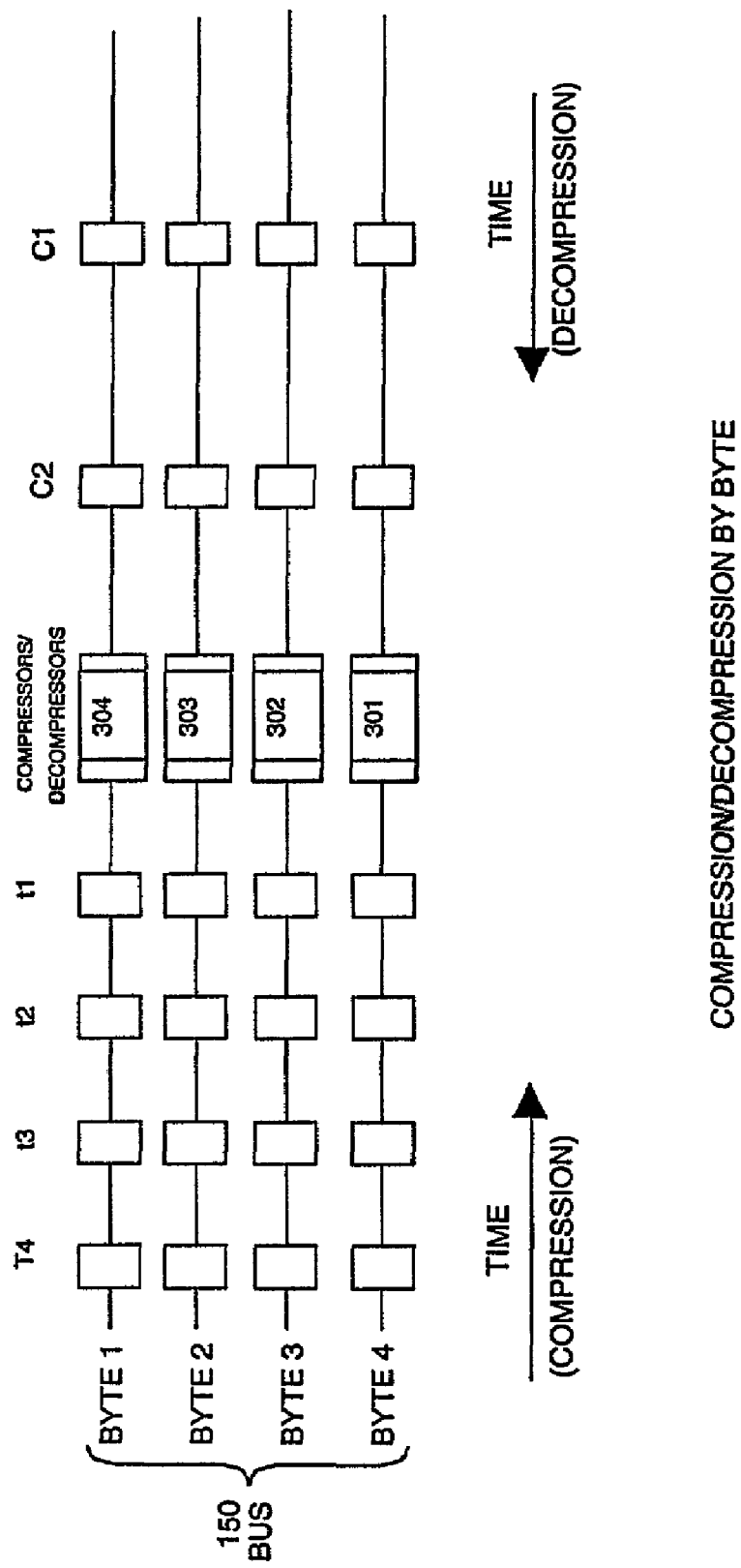
FIG. 3 illustrates a memory bus inline compression/decompression operation in accordance with one embodiment of the present invention.
Figure 4:
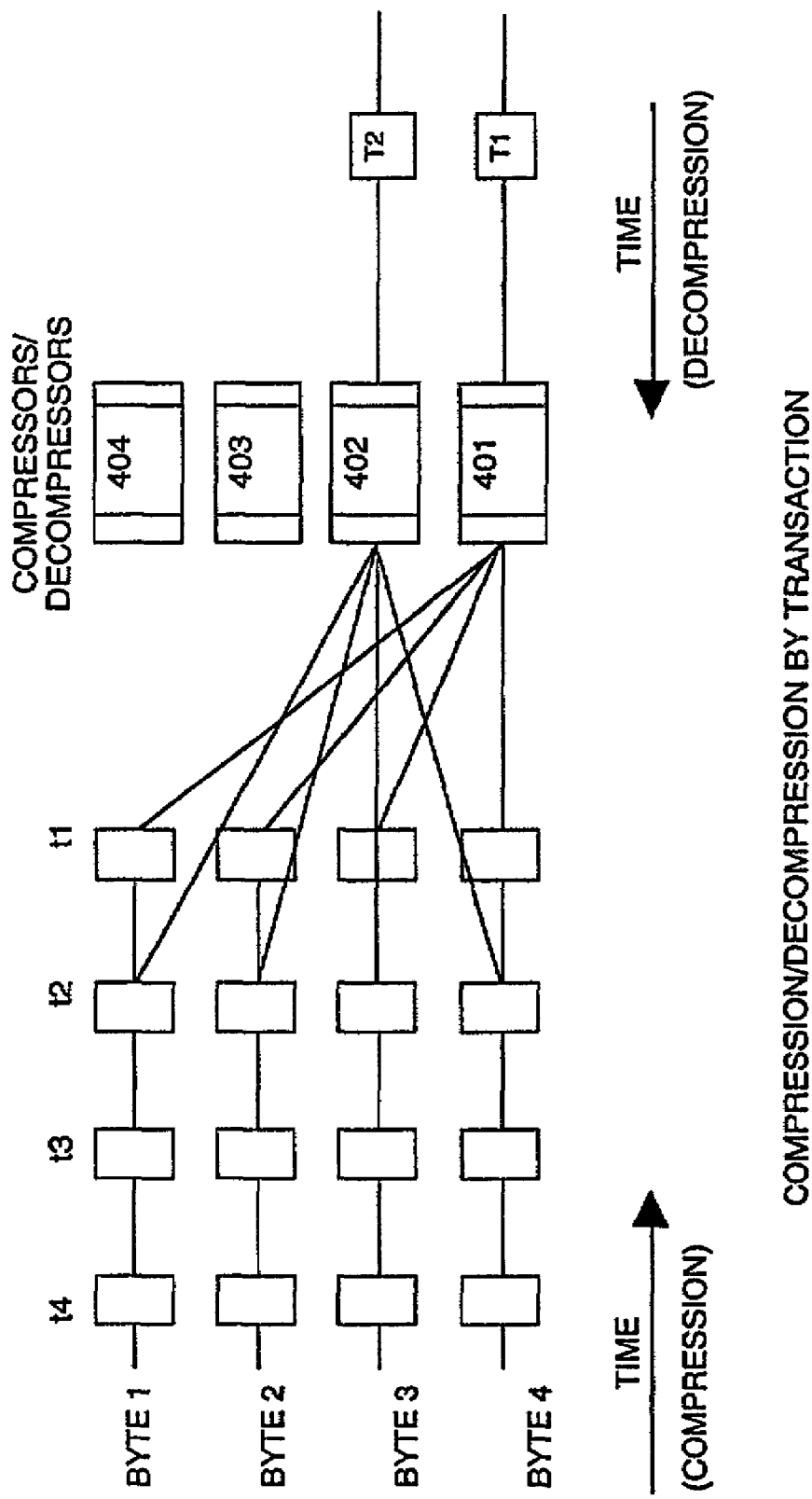
FIG. 4 illustrates a memory bus inline compression/decompression operation in accordance with one embodiment of the present invention.

Most modern hardware compression engines operate most efficiently when fed a byte-sized data block for each compression operation, much smaller than is typically employed by modern buses. FIGS. 3 and 4 illustrate two different methods of in-line compression/decompression without reducing memory bus bandwidth. The examples shown in the figures are for a four-byte-wide bus, but can be used for any bus width. An important concept presented in this embodiment of the present invention is that, instead of dividing a packet into equal pieces in a large scale, the packet can be divided into equal size pieces along byte boundaries. Existing compression engines can work at bus speed, but only a width of one byte.

FIG. 3 illustrates the operation of parallel compression engines that each compresses a single byte of the bus bandwidth at a time in any compression transaction. Bytes are most commonly eight bits in length. A 32 bit bus width would thus require four compression engines to continuously compress one byte at a time and a 64 bit wide bus would require eight compression engines. In FIG. 3, compression engines 301-304 are shown each being fed a single byte of a four byte wide (32 bit) data bus data transaction (t1, t2, etc.). It must be noted here that the transaction may be thousands of bytes long. In the example in FIG. 3, each engine processes every fourth byte of bus width. Engine 303, for example, processes bytes 2 and 6 of transaction t1. Decompression would work, essentially, in the reverse.

After compression, the resultant data, in this embodiment, is dependant upon the incoming data (t1, t2, t3, t4, etc.) and the compression algorithm used. The example in FIG. 3 shows a 2:1 compression ratio. This means that bytes 2 of compressed data blocks C1 and C2 contain the compressed data from byte 2 of t1, t2, t3, and t4. As each byte emerges, from the compression engine (C1, C2, etc.) it must be properly sequenced and aligned in buffers so that the transaction placed on the bus contains the full bus width of data. This means that there may be some bus cycles where there is no data on the bus at the output of the compressors since compressed data produces fewer bytes to be transferred. Therefore, the incoming uncompressed data is allowed to operate at full bus bandwidth, but the outgoing compressed data operates at the bus bandwidth divided by the compression ratio; at one half bus bandwidth in the example.

FIG. 3 further shows each byte width of the bus feeding one compressor/decompressor. For this example, this means every fourth byte is compressed by each compression engine. This slows down the response time of the bus by only the latency of the compression engine, and does not decrease bandwidth. Since the compressor is working at bus speeds, no buffering is required of data before it is compressed. However, a small amount of buffering is required at the output of the compressor to make sure that each compressor places one byte on the bus at the same time. This is required because there are fewer bytes at the output of a compressor than at the input and the compressed bytes need to be aligned to guarantee correct, coordinated, decompression.

Decompression, in this embodiment of the present invention, would be effected in the reverse process of compression. A small amount of buffering would be required to properly sequence and align compressed data prior to decompression. Since some realignment might be required after decompression, some downstream buffering might be required there, as well.

FIG. 4 illustrates another method for use of multiple compression engines that reduces added latency. Here, each memory bus transaction (t1, t2, etc) is fed, in byte-sized blocks, to only one compression engine, 401, 402, etc. Compression is accomplished by bus transaction. Each compressor is fed the number of bytes supported by the bus width. This requires buffering of one or two transactions for each compressor in order to operate at full bus speeds and possibly has a more complicated bus connection. While this method may show some advantages for complicated bus structures, in most cases the better method is the one shown in FIG. 3.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A method of processing data for transfer over a bus having a width, comprising:

dividing the data into a sequence of data segments each having a width at most equal to the bus width;

transmitting successive ones of the data segments to different data compression engines;

compressing the data segments in each of the data compression engines; and outputting the compressed data segments from the data compression engines onto the bus.

2. The method of claim 1, wherein the successive data segments are transmitted to N different data compression engines, N being an integer greater than 1, and the dividing comprises dividing the data into data segments each having a width equal to 1/N of the bus width.

3. The method of claim 2, wherein the bus width is N bytes.

4. The method of claim 2, wherein the data is transmitted in a series of bus transactions, and the dividing comprises dividing the data in each bus transaction into multiple ones of the data segments.

5. The method of claim 1, wherein the dividing comprises dividing the data into data segments each having a width equal to the bus width.

6. The method of claim 5, wherein the data is transmitted in a series of bus transactions, and the data in each bus transaction corresponds to a respective one of the segments.

7. The method of claim 6, wherein the outputting comprises concurrently outputting onto the bus ones of the compressed data segments corresponding to different bus transactions.

8. The method of claim 1, wherein the dividing comprises dividing the data along byte boundaries.

9. The method of claim 1, wherein the compressing comprises concurrently compressing respective ones of the data segments in the different data compression engines.

10. The method of claim 1, wherein the outputting comprises concurrently outputting onto the bus respective ones of the compressed data segments from the different data compression engines.

11. A method of processing compressed data for transfer over a bus having a width, comprising:

dividing the compressed data into a sequence of data segments each having a width less than the bus width;

transmitting successive ones of the data segments to different data decompression engines;

decompressing the data segments in each of the data decompression engines; and outputting the decompressed data segments from the data decompression engines onto the bus.

12. The method of claim 11, wherein the successive data segments are transmitted to N different data decompression engines, N being an integer greater than 1, and the dividing comprises dividing the data into data segments each having a width equal to 1/N of the bus width.

13. The method of claim 12, wherein the bus width is N bytes.

14. The method of claim 12, wherein the data is transmitted in a series of bus transactions, and the dividing comprises dividing the data in each bus transaction into multiple ones of the data segments.

15. The method of claim 11, wherein the dividing comprises dividing the compressed data along byte boundaries.

16. The method of claim 11, wherein the decompressing comprises concurrently decompressing respective ones of the data segments in the different data decompression engines.

17. The method of claim 11, wherein the outputting comprises concurrently outputting onto the bus respective ones of the decompressed data segments from the different data compression engines.

18. The method of claim 11, wherein the outputting comprises sequentially outputting onto the bus respective ones of the decompressed data segments from different decompression engines in a series of bus transactions.

19. A system for processing data, comprising:

a bus having a width; and multiple data processing engines coupled to the bus and arranged to receive respective ones of successive data segments sequentially divided from the data, each of the data segments having a width at most equal to the bus width, wherein the data processing engines process respective ones of the received data segments by performing data compression related operations on the received data segments, and the data processing engines output the processed data segments onto the bus.

20. The system of claim 19, wherein N of the data processing engines are arranged to receive respective ones of the data segments having widths equal to 1/N of the bus width.

21. The system of claim 20, wherein the bus width is N bytes.

22. The system of claim 20, wherein the bus transfers the data in a series of bus transactions, and the data in each of the bus transactions is divided into multiple ones of the data segments.

23. The system of claim 19, wherein each of the data segments has a width equal to the bus width.

24. The system of claim 23, wherein the bus transfers the data in a series of bus transactions, and the data in each bus transaction corresponds to a respective one of the segments.

25. The system of claim 24, wherein the data processing engines concurrently output onto the bus ones of the processed data segments corresponding to different bus transactions.

26. The system of claim 19, wherein each of the data segments is divided along byte boundaries.

27. The system of claim 19, wherein the data processing engines concurrently perform the data compression related operations on respective ones of the received data segments.

28. The system of claim 19, wherein the data processing engines concurrently output onto the bus respective ones of the processed data segments.

29. The system of claim 19, wherein the processing engines compress the received data segments.

30. The system of claim 19, wherein the processing engines decompress the received data segments.

31. The system of claim 19, wherein the data processing engines sequentially output onto the bus respective ones of the processed data segments in a series of bus transactions.

32. The method of claim 1, wherein the dividing comprises dividing the data into the sequence of data segments each comprising contiguous bytes of the data.

33. The method of claim 11, wherein the dividing comprises dividing the data into the sequence of data segments each comprising contiguous bytes of the data.

* * * * *